(12) United States Patent
Larson et al.

(10) Patent No.: US 8,328,591 B2
(45) Date of Patent: Dec. 11, 2012

(54) SYSTEM, METHOD, AND ARTICLE OF MANUFACTURE FOR COOLING AND FILTERING ENGINE INTAKE AIR

(75) Inventors: Brandon James Larson, Cincinnati, OH (US); Joseph Brower, Grove City, PA (US)

(73) Assignee: General Electric Company, Schenectady, NY (US)

( * ) Notice: Subject to any disclaimer, the term of this patent is extended or adjusted under 35 U.S.C. 154(b) by 104 days.

(21) Appl. No.: 12/968,509

(22) Filed: Dec. 15, 2010

(65) Prior Publication Data

US 2012/0156949 A1  Jun. 21, 2012

(51) Int. Cl.
  *B63B 35/73* (2006.01)
(52) U.S. Cl. .................................................. 440/88 A
(58) Field of Classification Search ................. 440/88 A
  See application file for complete search history.

(56) References Cited

U.S. PATENT DOCUMENTS

| | | | | |
|---|---|---|---|---|
| 3,445,093 A | * | 5/1969 | Reder | 261/24 |
| 3,479,948 A | * | 11/1969 | Mathews | 454/333 |
| 4,441,476 A | | 4/1984 | Roberts et al. | |
| 6,257,211 B1 | * | 7/2001 | Vela, Jr. | 123/542 |
| 6,584,759 B1 | * | 7/2003 | Heap | 60/39.44 |
| 6,817,197 B1 | | 11/2004 | Padfield | |
| 2006/0237049 A1 | * | 10/2006 | Weaver et al. | 134/56 D |
| 2009/0053040 A1 | * | 2/2009 | Chillar et al. | 415/116 |

\* cited by examiner

*Primary Examiner* — Stephen Avila
(74) *Attorney, Agent, or Firm* — GE Global Patent Operation; John A. Kramer

(57) ABSTRACT

Various methods and systems are provided for an air induction system for an engine. In one example, the air induction system includes an intake conduit and an assembly coupled to the intake conduit which includes a water spray for removing particulates from, and for cooling, intake air flowing through the water spray.

23 Claims, 4 Drawing Sheets

SYSTEM, METHOD, AND ARTICLE OF MANUFACTURE FOR COOLING AND FILTERING ENGINE INTAKE AIR

FIELD

Embodiments of the invention relate to air intake systems for an engine. Other embodiments relate to systems, methods, and assemblies for treating ambient intake air of an engine.

BACKGROUND

Internal combustion engines may employ a filter to clean a flow of intake air before it enters the engine. In this manner, an amount of particulates that enters the engine may be reduced, thereby reducing engine degradation, for example. Further, internal combustion engines may employ a cooler, such as a charge air cooler, to cool the flow of intake air before it enters the engine, thereby increasing the density of the intake air, resulting in increased engine performance.

In some examples, a vessel that includes the engine may travel through conditions in which the air is particulate-laden with fine particulates, such as fine sand particles. In such an example, the air filter and/or charge air cooler may become clogged, resulting in reduced engine operating efficiency and reduced cooling.

BRIEF DESCRIPTION

In one embodiment, an air induction system for an engine is disclosed. The air induction system comprises an intake conduit and an assembly coupled to the intake conduit which includes a water spray for removing particulates from, and for cooling, intake air flowing through the water spray.

In such an embodiment, the water spray may be delivered by at least one conduit which traverses the assembly and includes a plurality of delivery ports such that the cross-section of the assembly is sprayed with water. As such, the water spray may contact particulates in the airflow thereby removing them from the airflow. Further, the water spray may provide cooling to the airflow if the temperature of the water in the water spray is less than the temperature of the intake air. In this manner, the assembly filters and cools intake air that passes through it.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
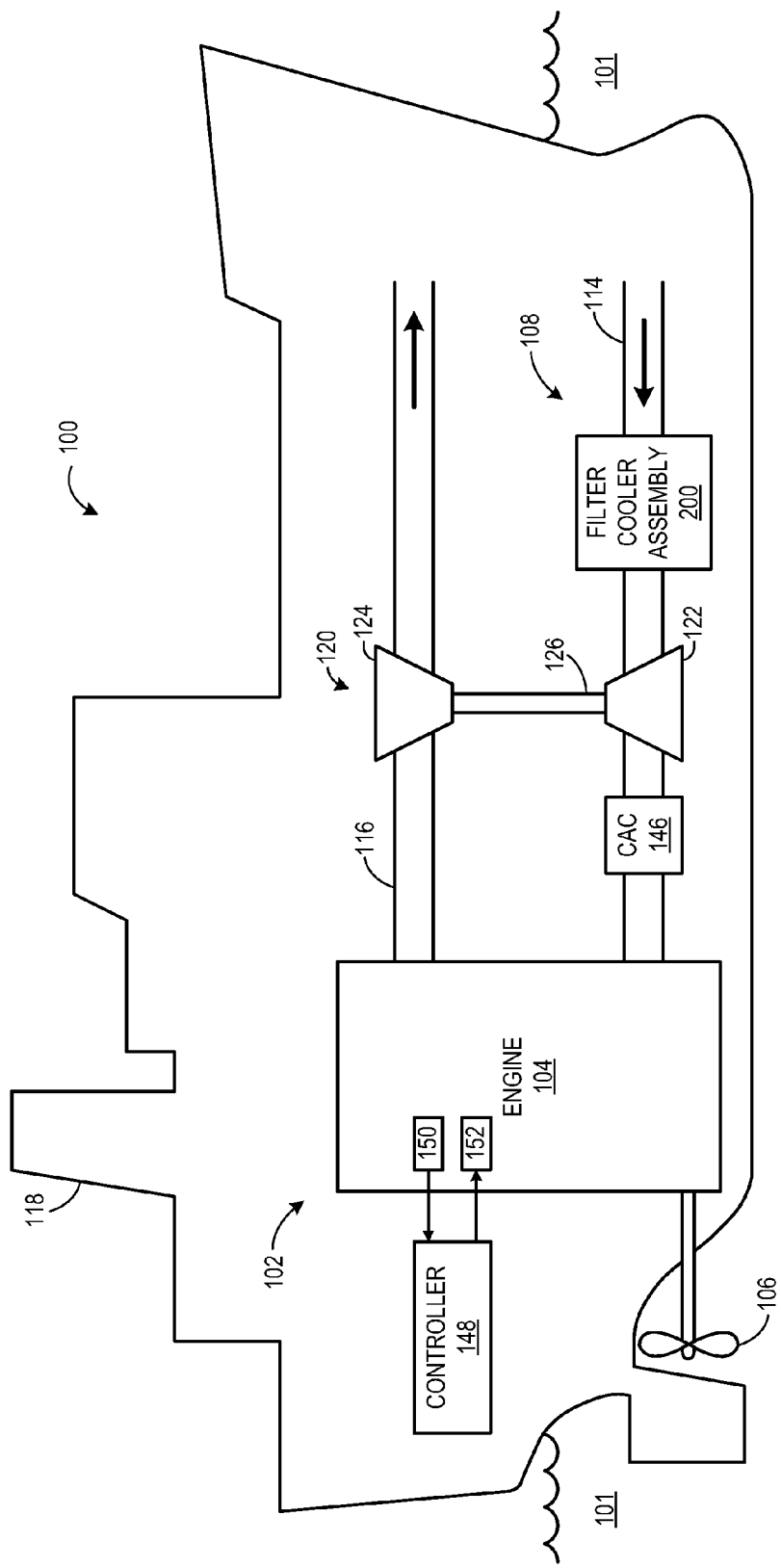
FIG. 1 shows a schematic diagram of an example embodiment of a marine vessel with an engine system that includes a combined filter-cooler assembly.
Figure 2:
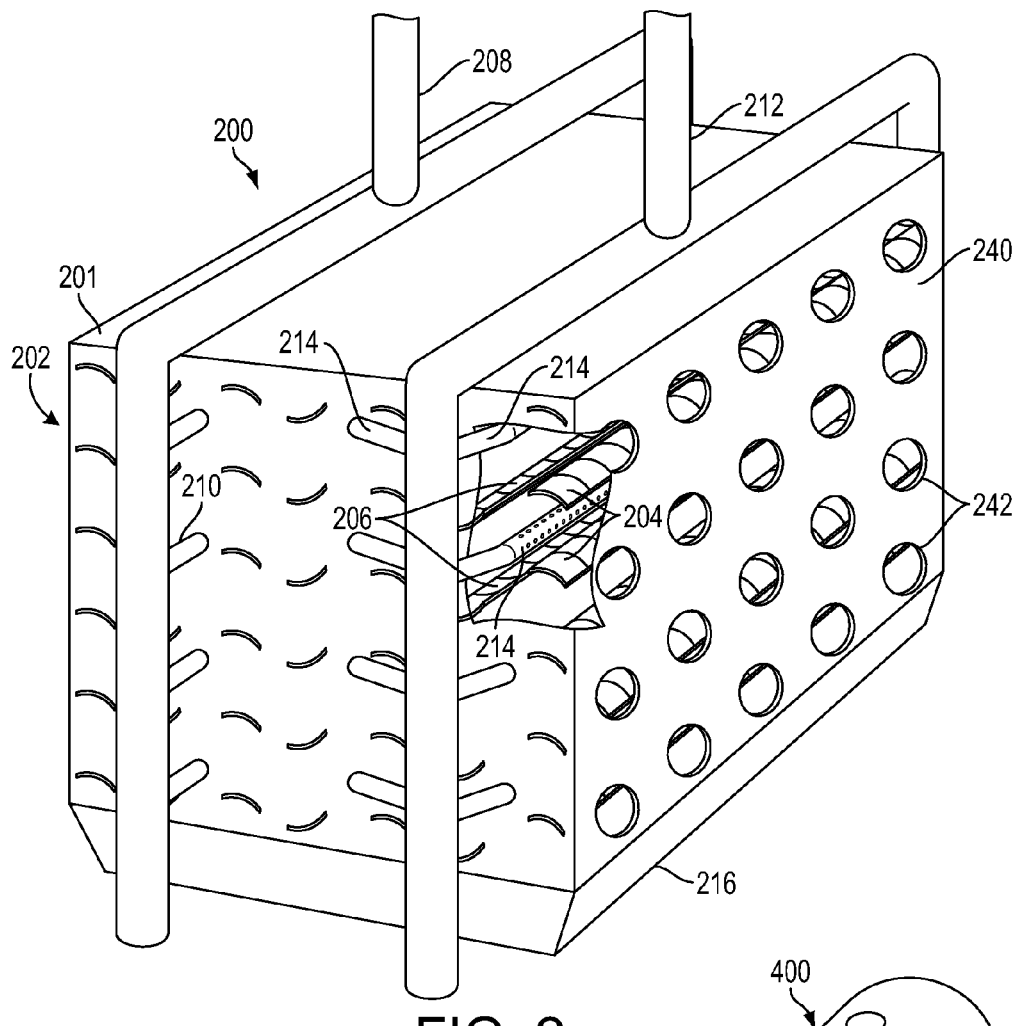
FIG. 2 shows a perspective view of an example embodiment of a combined filter-cooler assembly.
Figure 3:
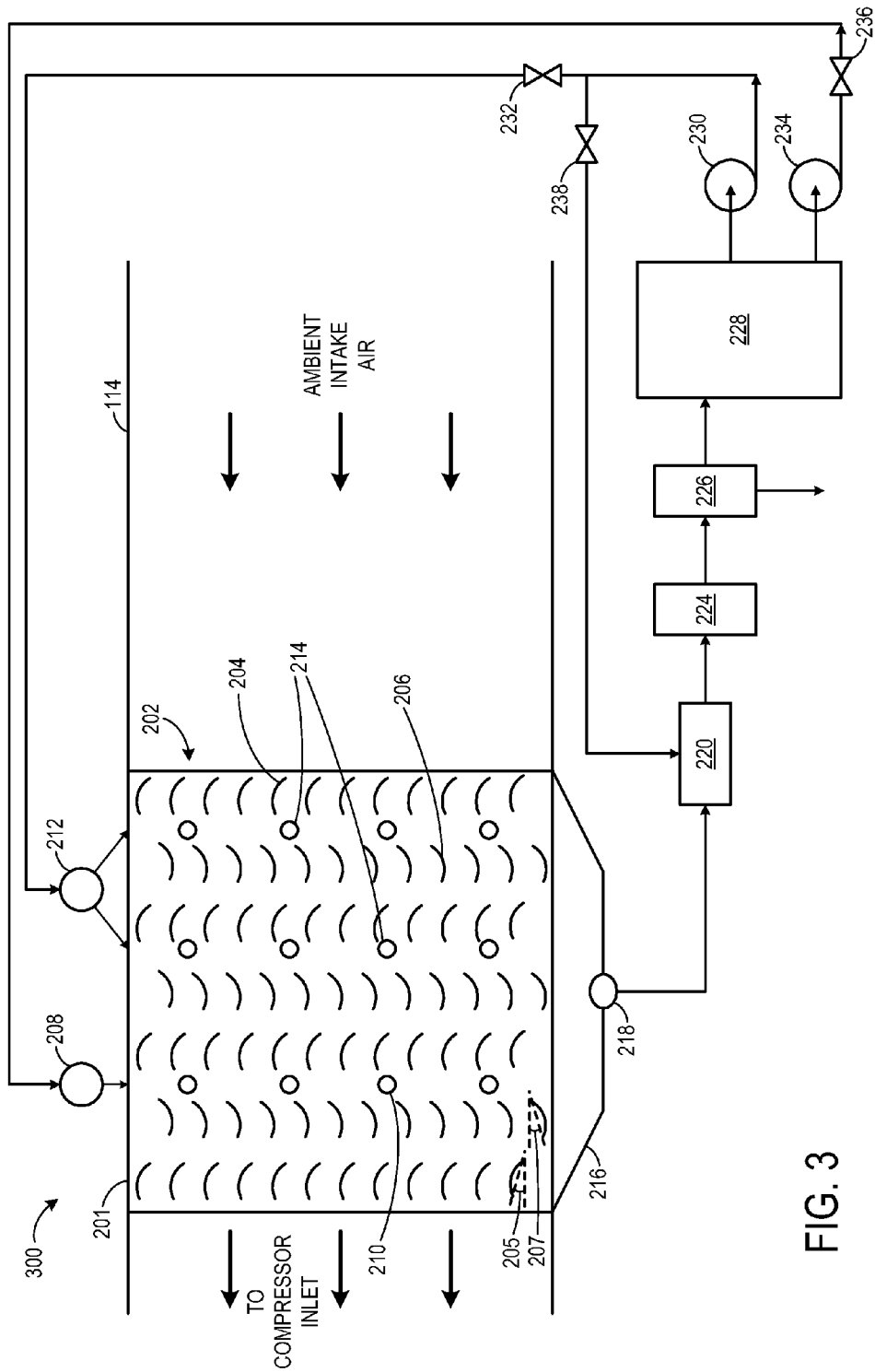
FIG. 3 shows a schematic diagram of an example embodiment of a combined filter-cooler assembly positioned in an intake conduit.

The following description relates to various embodiments of an air induction system of an engine that includes a combined filter-cooler assembly for filtering and cooling the flow of intake air. FIG. 1 shows an example in which the combined filter-cooler assembly is coupled to an intake conduit of an air induction system of an engine included in a marine vessel. Details of example embodiments of the combined filter-cooler assembly are described with reference to FIGS. 2 and 3. For example, FIG. 2 shows a perspective view of an example embodiment of the combined filter-cooler assembly in which an upstream side of the combined filter-cooler assembly is visible. FIG. 3 shows a side view of the combined filter-cooler assembly which includes a water circuit that supplies water to a water spray region of the combined filter-cooler assembly and filters water that drains from the combined filter-cooler assembly. Further details of a water delivery conduit which traverses the water spray region are described with reference to a perspective view of the conduit shown in FIG. 4. An example method for the combined filter-cooler assembly is described with reference to FIG. 5.

FIG. 1 is a block diagram of an example embodiment of a system, herein depicted as a marine vessel 100, such as a ship, configured to operate in a body of water 101. The marine vessel 100 includes a propulsion system 102 with an engine 104. However, in other examples, engine 104 may be a stationary engine, such as in a power-plant application, or an engine in a rail vehicle propulsion system. In the example embodiment of FIG. 1, a propeller 106 is mechanically coupled to the engine 104 such that it is turned by the engine 104. In other examples, the propulsion system 102 may include a generator that is driven by the engine, which in turn drives a motor that turns the propeller, for example.

The engine 104 receives intake air for combustion through an air induction system 108 which includes an intake conduit 114. The intake conduit 114 receives ambient air from outside of the marine vessel 100. Exhaust gas resulting from combustion in the engine 104 is supplied to an exhaust passage 116. Exhaust gas flows through the exhaust passage 116, and out of an exhaust stack 118 of the marine vessel 100. In one example, the engine 104 is a diesel engine that combusts air and diesel fuel through compression ignition. In other non-limiting embodiments, the engine 104 may combust fuel including gasoline, kerosene, biodiesel, or other petroleum distillates of similar density through compression ignition (and/or spark ignition).

In the example embodiment of FIG. 1, a turbocharger 120 is arranged between the intake conduit 114 and the exhaust passage 116. The turbocharger 120 increases air charge of ambient air drawn into the intake conduit 114 in order to provide greater charge density during combustion to increase power output and/or engine-operating efficiency. The turbocharger 120 includes a compressor 122 arranged along the intake conduit 114. The compressor 122 is at least partially driven by a turbine 124 (e.g., through a shaft 126) that is arranged in the exhaust passage 116. While in this case a single turbocharger is shown, the system may include multiple turbine and/or compressor stages. Further, the air induction system 108 includes a charge air cooler (CAC) 146 arranged in the intake conduit 114 downstream of the compressor 122. The CAC 146 cools the air charge of ambient air after it passes through the turbocharger 120 in order to further increase the intake air charge density thereby further increasing the engine operating efficiency.

Further, the air induction system 108 depicted in the example embodiment of FIG. 1 includes a combined filter-cooler assembly 200. The combined filter-cooler assembly 200 is configured to remove particulates from the ambient intake air, as well as cool the ambient intake air, via a water spray, as will be described in greater detail below with reference to FIGS. 2-5. For example, the marine vessel may travel through areas where a relatively large amount of thin, fine sand is present in the ambient intake air. Under such conditions, an air filter composed of fibrous materials, for example, may become easily clogged. In the example embodiment shown in FIG. 1, the combined filter-cooler assembly is positioned upstream of the CAC 146 in the intake conduit 114.

The marine vessel 100 further includes a controller 148 to control various components related to the propulsion system 102. In one example, the controller 148 includes a computer control system. The controller 148 further includes computer readable storage media (not shown) including code for enabling on-board monitoring and control of marine vessel operation. The controller 148, while overseeing control and management of the propulsion system 102, may be configured to receive signals from a variety of engine sensors 150, as further elaborated herein, in order to determine operating parameters and operating conditions, and correspondingly adjust various engine actuators 152 to control operation of the marine vessel 100. For example, the controller 148 may receive signals from various engine sensors 150 including, but not limited to, engine speed, engine load, boost pressure, exhaust pressure, ambient pressure, ambient temperature, etc. Correspondingly, the controller 148 may control the propulsion system 102 by sending commands to various components such as cylinder valves, throttle, etc.

FIGS. 2 and 3 show examples of combined filter-cooler assemblies 200 and 300, respectively, such as the combined filter-cooler assembly 200 shown in FIG. 1, which may be articles of manufacture. In the examples illustrated in FIGS. 1-3, like parts are identified by like reference numbers. As depicted in the schematic diagram shown in FIG. 2, the combined filter-cooler assembly 200 is positioned in the intake conduit 114 such that ambient intake air flows through the combined filter-cooler assembly 200 before flowing to an inlet of the compressor of the turbocharger. In this way, substantially all of the ambient intake air that enters the intake conduit 114 is filtered and cooled by the combined filter-cooler assembly 200.

As shown in the embodiment illustrated in FIG. 2, the combined filter-cooler assembly 200 includes a body 201 that encloses a water spray region 202. The body may be made of stainless steel, for example, or another suitable material that is resistant to rust. The combined filter-cooler assembly 200 is part of, and forms a section of, the air intake conduit 114. For example, a first conduit may lead up to an ingress of the combined filter-cooler assembly, the ingress receiving air from external to the engine. A second conduit may lead away from an egress of the combined filter-cooler assembly, the egress delivering the intake air to an intake of the engine.

The perspective view of the combined filter-cooler assembly 200 depicted in FIG. 2 shows an upstream side of the body (e.g., ingress) including a perforated screen 240 with a plurality of perforations 242 dispersed across the length and width of the perforated screen 240. In some examples, the perforated screen 240 may be made of the same material as the rest of the body, such as stainless steel. In other examples, the perforated screen 240 may be made of a material that is different than the rest of the body, such as a porous material that is permeable to the flow of intake air, for example. Although the perforations 242 are depicted as having a round shape, it should be understood the perforations may have any suitable shape. Further, as shown in FIG. 2, each perforation 242 has substantially the same size. For example, each perforation may have a diameter of 1 inch (2.54 cm). In other examples, the perforations may have varying sizes.

In some embodiments, a downstream side (not shown) of the body (e.g., egress) may be substantially open such that airflow exiting the combined filter-cooler assembly is unimpeded. In other embodiments, the downstream side of the body may have a similar structure to the upstream side of the body depicted in FIG. 2. In still other embodiments, the downstream side of the body may be comprised of a number of horizontal slats traversing the width of the downstream side such that direction of the airflow exiting the combined filter-cooler assembly is returned to its initial direction.

Further, at least one turbulence-generating slat may traverse the water spray region 202 in a direction perpendicular to the flow direction of intake air (e.g., perpendicular to the plane of the page in FIG. 3). In the example embodiments depicted in FIGS. 2 and 3, a plurality of slats traverse the water spray region 202. For example, downwardly curved slats 204 and upwardly curved slats 206 are shown dispersed throughout the water spray region 202, each slat having substantially the same radius of curvature. As depicted, alternating columns of downwardly curved slats 204 and upwardly curved slats form an alternating inversion pattern. In the example embodiment of FIG. 3, the curved slats are angled with respect to initial direction of the flow of intake air. For example, curved slats 204 have an angle indicated at 205 (e.g., 15°) and curved slats 206 have an angle indicated at 207 (e.g., −15°). The curved slats change the direction of the intake airflow thereby generating turbulence in the airflow as it travels through the combined filter-cooler assembly. In some examples, one or more slats may have a different radius of curvature. In other embodiments, the slats may be flat instead of curved and the slats may have different angles with respect to the initial airflow direction (e.g., 20°, 60°, etc.), for example. In still other embodiments, the combined filter-cooler assembly may include a combination of curved and flat slats. Further, in some embodiments, the slats may be dispersed in a random array throughout the water spray region 202.

The curved slats 204 and 206 may be made of the same material as the body of the combined filter-cooler assembly, such as stainless steel, for example. In other examples, the curved slats may be made of a different material than the body of the combined filter-cooler assembly. Further, the curved slats 204 and 206 may be coated with polytetrafluoroethylene or nitrated with salt bath. In this manner, degradation of the blades from water contact and/or build up of particulates from the intake air may be reduced.

Further, at least one conduit, such as a water delivery conduit, may traverse the water spray region 202 in a direction perpendicular to the flow direction of intake air (e.g., perpendicular to the plane of the page in FIG. 3). The at least one conduit may be positioned downstream of at least one of the slats that traverses the water spray region 202. The conduit may be a tube or a pipe, for example. Further, the conduit may be made of any suitable material, such as metal, plastic, or rubber. In the example of FIG. 3, the combined filter-cooler assembly 200 includes a plurality of upstream conduits 214 (e.g., eight conduits arranged in two columns of four) fluidically coupled (not shown in FIG. 3) to an upstream water header 212 and a plurality of downstream conduits 210 (e.g., four conduits) fluidically coupled (shown in FIG. 2) to a downstream water header 208. As depicted, the downstream conduits 210 are aligned in parallel along a vertical direction of the combined filter-cooler assembly 200. Likewise, the four upstream conduits 214 in each of the two conduits are aligned in parallel along a vertical direction of the combined filter-cooler assembly 200. Further, the upstream conduits 214 and downstream conduits 210 form four rows in which the conduits are aligned in parallel along a horizontal direction (e.g., airflow direction) in each row. In other embodiments, the alignment of the conduits may be staggered, for example. It should be understood that the combined filter-cooler assembly may include any suitable number of water headers which may supply water to any suitable number of conduits, as desired.

The number and positions of the slats and conduits traversing the combined filter-cooler assembly is such that the intake airflow path is unimpeded at a macro level. For example, the airflow path of the combined filter-cooler assembly extends from the ingress to the egress. At the macro level, the unimpeded intake airflow path may be free of any restriction smaller than 1 mm, for example. Specifically, the unimpeded intake airflow at the macro level may have all openings within the filter-cooler assembly with a height and width, or a diameter, of at least 1 mm, for example. In an embodiment, due to the unimpeded airflow at a macro level, the intake air is only filtered within the water spray region of the assembly by way of its interaction with the water spray. This allows substantially all the particulates removed from the intake air by the water to fall to the bottom of the assembly for collection and subsequent filtration of the particulates from the water. It also allows for filtration and removal of relatively large particles, such as sand, without clogging a conventional mechanical filter.

In the example embodiment depicted in FIG. 2, the fluidic coupling between the water headers and the water delivery conduits is shown. For example, downstream water header 208 is formed in an upside down U-shape around the combined filter-cooler assembly 200, and each end of four conduits 210 that traverse a water spray region 202 is fluidically coupled to the water header 208. Upstream water header 212 is formed in an upside down U-shape around the combined filter-cooler assembly 200, and each end of eight conduits 214 that traverse the water spray region 202 is fluidically coupled to the water header 212. In such a configuration, the coupling of each end of a water delivery conduit to the U-shaped water header allows for uniform pressure along the length of each of the conduits, and therefore, a uniform water pressure maybe be delivered by each of the conduits.

Figure 4:
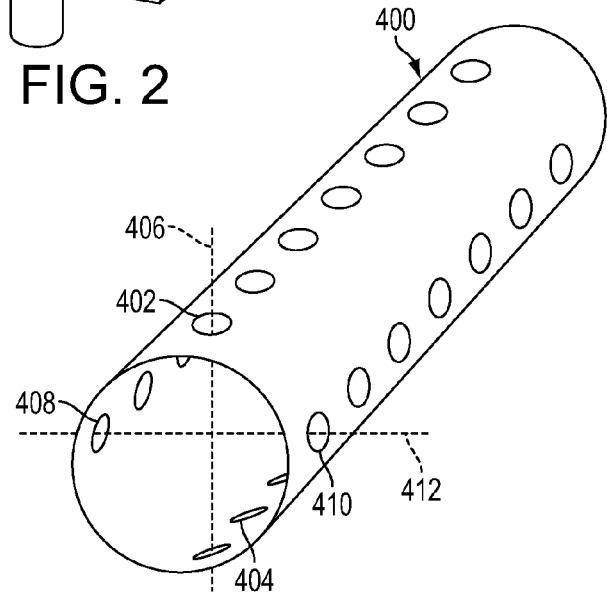
FIG. 4 shows a perspective view of an example embodiment of a water delivery conduit that is included in a combined filter-cooler assembly.

FIG. 4 shows an example embodiment of a section of a water delivery conduit 400, such as an upstream conduit 214 or a downstream conduit 210 described above with reference to FIGS. 2 and 3. As shown in the example of FIG. 4, the conduit 400 includes a plurality of delivery ports that are dispersed along the length of the conduit 400 through which water is delivered in different directions to the water spray region of the combined filter-cooler assembly. For example, the conduit 400 includes delivery ports 402 along the length of the top of the conduit 400 and delivery ports 404 along the bottom of the conduit. The conduit 400 further includes delivery ports 408 along one side of the conduit 400 (e.g., the downstream side) and delivery ports 410 along the opposite side of the conduit 400 (e.g., the upstream side). As shown in FIG. 4, the delivery ports form a t-shape through a cross-section of the conduit 400, as indicated by lines 406 and 412.

In this manner, water spray may be delivered along the length, width, and depth of the combined filter-cooler assembly thereby spanning a full cross-section from top to bottom of the interior of the combined filter-cooler assembly.

In other examples, the delivery ports may form an x-shape through a cross-section of the conduit. In still other examples, the delivery ports may be formed in a spiral or random array along the length of each conduit. Furthermore, one or more conduits traversing the combined filter-cooler assembly may have delivery ports positioned in a different configuration. Thus, the delivery ports may be dispersed in a desired configuration along the length, width, and depth of the combined filter-cooler assembly thereby delivering water spray to substantially the entire interior of the combined filter-cooler assembly.

Continuing with FIG. 3, the upstream water header 212 may be a high pressure water header that delivers a relatively high pressure water spray, and the downstream water header 208 may be a low pressure water header that delivers a relatively low pressure water spray. As such, the upstream water header 212 and upstream conduits 214 form a high pressure water assembly, and the downstream water header 208 and downstream conduits 210 form a low pressure water assembly. The high pressure water spray may be delivered upstream of the low pressure water spray so that the high pressure water spray may contact the particulates in the flow of intake air such that they are knocked out of (e.g., removed from) the turbulent airflow. Particulates that are removed from the airflow fall uncollected to a bottom of the assembly, as will be described in greater detail below. In this manner, the particulates are washed from the flow of intake air, for example. Some cooling of the airflow may occur as the water passes through the high pressure water spray. Once at least some of the particulates have been removed from the airflow, the airflow moves through the low pressure water spray in which it is further cooled and humidified by the spray of relatively low pressure water.

The water header 208 is supplied with water by water pump 234 which may be a high pressure water pump (e.g., water pump 234 supplies water with a relatively higher pressure than water pump 230) that is in included in a water supply circuit of the combined filter-cooler assembly 200. The water header 212 is supplied with water by water pump 230 which may be a low pressure water pump (e.g., water pump 230 supplies water with a relatively lower pressure than water pump 234) that is included in the water supply circuit. The supplies of water from pumps 234 and 230 to the water headers 208 and 212 are controlled by valves 236 and 232, respectively. The valves 232 and 236 may be globe valves or check valves, for example, in communication with a controller, such as controller 148 described with reference to FIG. 1.

The pumps 230 and 234 pump water from water supply 228. In some embodiments, water supply 228 may be water (e.g., sea water) from the body of water in which the marine vessel in which the combined filter-cooler assembly is positioned is traveling. In other examples, the water supply 228 may be a make-up feed tank which holds fresh water. The water supply 228 may further include water which has been drained from the combined filter-cooler assembly and filtered by the water filtration circuit.

Particulates that are removed from the water spray region and fall to the bottom of the combine filter-cooler assembly, as well as at least some of the water that is delivered to the water spray region, are collected in a collector 216 positioned at a base of the combined filter cooler assembly 200 (e.g., the bottom of the combined filter-cooler assembly). As shown in the example embodiments of FIGS. 2 and 3, collector 216 has a pan shape with a drain conduit 218 that extends the width of the collector 216 and is fluidically coupled to the water filtration circuit. In other embodiments, the collector 216 may have a funnel shape with a single hole at the bottom as a drain that is fluidically coupled to the water filtration circuit. The drain conduit 218 may have a length or diameter that is large enough that particulates that fall into the collector 216 can be drained from the collector (e.g., at least the size of perforations 242 in the perforated screen 240). In this example, particulates impacted and/or entrain by the water spray pass down, uncollected, until the particles then can be drained and flushed out. In this way, the intake airflow path may remain unimpeded at a macro level even when particulates are continually removed over a long period of engine operation. Further, clogging of the drain conduit 218 and the collector 216 may be reduced, since this configuration avoids particulates being collected on a filter and then dripping down in such a way as may clog the system.

The water filtration circuit includes eductor 220 which is configured to pump water and particulates from the collector 216. For example, valve 238 may be opened during operation of the water pump 230 to create a venturi effect in the eductor 220 which draws water and particulates from the collector 216 and through the eductor 220. Valve 238 may be a globe valve or a check valve, for example, in communication with a controller, such as controller 148 described with reference to FIG. 1.

After passing through the eductor 220, water and particulates enter a first filter 224, such as a duplex strainer, where larger particulates are removed. In the example in which the first filter 224 is a duplex strainer, particulates collected by the duplex strainer may be removed manually as needed, for example.

After passing through the first filter 224, water and any remaining particulates enter a second filter 226, such as a separator or three-wing device, which removes finer particulates from the flow. In the example in which the second filter is a separator or three-wing device, the finer particulates (e.g., sand) collected by the separator or three-wing device may be discharged to the body of water in which the marine vessel is traveling. Water that has been filtered by the second filter 224 then passes to the water supply 228. It should be understood that the components of the water filtration circuit described above are for the purpose of example, and one or more of the components of the water filtration circuit may be removed or replaced without departing from the scope of the present invention.

Figure 5:
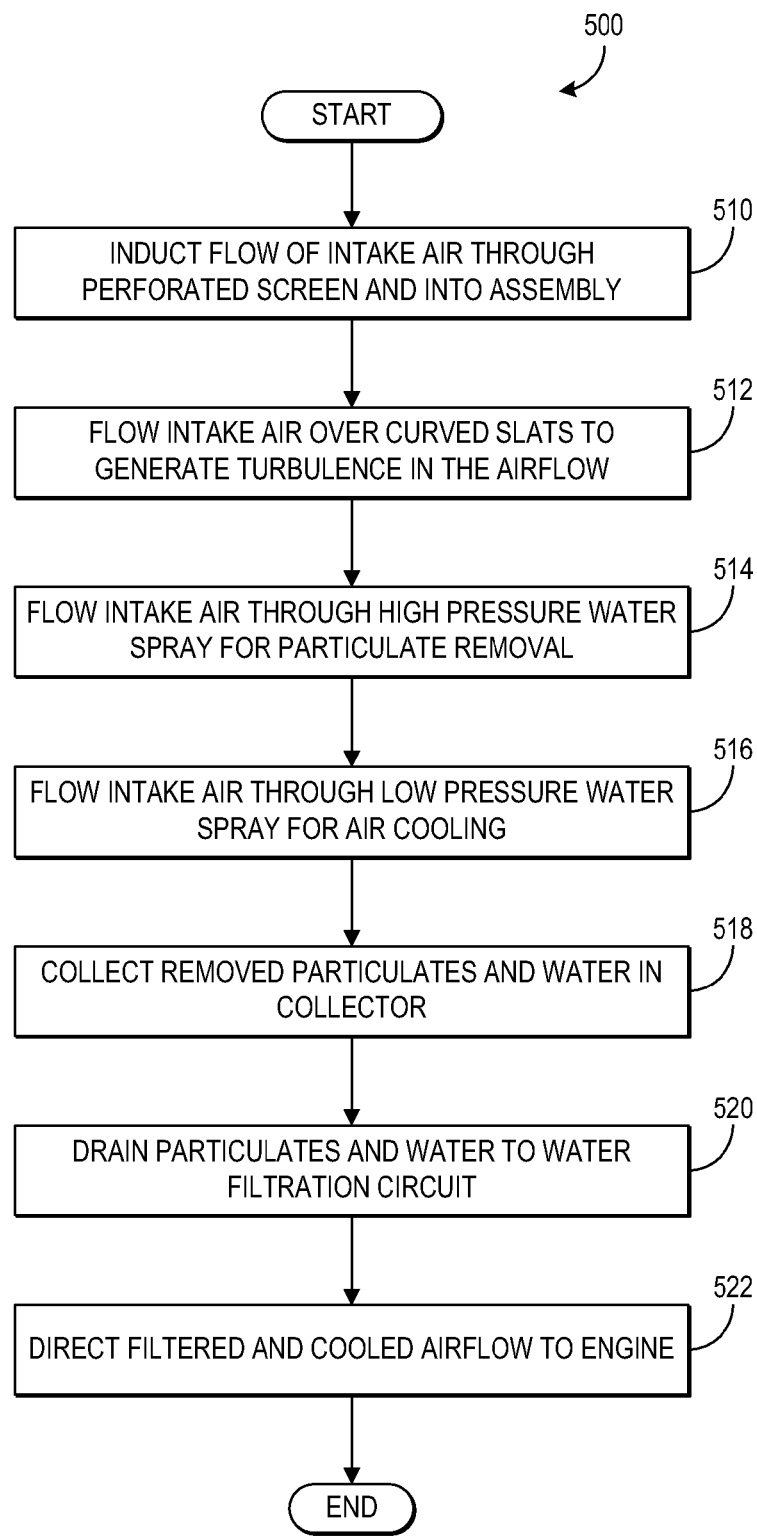
FIG. 5 shows a flow chart illustrating an example embodiment of a method for an induction system that includes a combined filter-cooler assembly.

Continuing to FIG. 5, it shows a flow chart illustrating an example embodiment of a method 500 for a combined filter-cooler assembly, such as combined filter-cooler assembly 200 or 300 described above with reference to FIGS. 2 and 3, respectively. Specifically, method 500 describes the flow of intake air through the combined filter-cooler assembly and how it is filtered and cooled.

At 510 of method 500, ambient intake air is inducted into the combined filter-cooler assembly. As described above with reference to FIG. 2, the combined filter-cooler assembly may include a perforated screen on the upstream side of the assembly such that relatively large particulates (e.g., larger than the size of the perforations) are filtered from the flow of intake air as the intake air enters the combined filter-cooler assembly.

At 512 of method 500, the intake air flows over curved slats, such as slats 204 and 206 described above with reference to FIGS. 2 and 3, such that turbulence is generated in the airflow. In this manner, the direction of the airflow is changed and the particulates, which are heavier than the air, may impact the slats instead of following the change in direction of the airflow.

Once turbulence is generated in the flow of intake air, the intake flows through a high pressure water spray at 514 of method 500. For example, a high pressure pump may be operated to deliver the water spray through delivery ports in one or more first water delivery conduits fluidically coupled to the high pressure water pump, as described above, such that the high pressure water spray spans a cross-section from top to bottom of the interior of the combined filter-cooler assembly. The high pressure water spray contacts particulates in the airflow thereby removing them from the airflow. Further, the high pressure water spray may provide some cooling to the flow of intake air.

After flowing through the high pressure water spray, the intake air flows through a relatively low pressure water spray at 516 of method 500. For example, a low pressure pump may be operated to deliver the water spray through delivery ports in one or more low pressure water delivery conduits (one or more second water delivery conduits) fluidically coupled to the low pressure water pump, as described above, such that the low pressure water spray spans a cross-section from top to bottom of the interior of the combined filter cooler assembly. The low pressure water spray may provide greater cooling to the flow of intake air than the high pressure water spray, as well as provide some particulate removal. Additionally, by flowing the intake air through the high pressure and low pressure water sprays, the intake air may be humidified, which may assist in reducing $NO_x$ emissions, for example.

At 518 of method 500, particulates that are removed from the water sprays, as well as some of the water from the water sprays, are collected in a collector positioned at the base of the combined filter-cooler assembly, such as collector 216 described above with reference to FIGS. 2 and 3.

Particulates and water that are collected in the collector, are drained to a water filtration circuit at 520 of method 500. The water filtration circuit may include at least one filter which removes particulates from the water. The filtered water may then flow to a tank where it may be pumped to be used again in the combined filter-cooler assembly.

At 522 of method 500, the filter and cooled flow of intake air is directed to the engine. In some examples, the airflow may be compressed by a compressor of a turbocharger and/or further cooled by a charge air cooler such that the air charge reaches a desired density, for example.

Thus, the combined filter-cooler assembly may include one or more turbulence-generating slats which traverse the assembly in a direction perpendicular to the flow direction of the intake air and one or more water delivery conduits which traverse the assembly in a direction perpendicular to the flow direction of the intake air. In this manner, the combined filter-cooler assembly may remove particulates from the flow of intake air as well as cool and humidify the flow of intake air.

Another embodiment relates to an air induction system for an engine. The air induction system includes an assembly configured to be coupled upstream of the air intake of an engine. The assembly includes a body (e.g., housing) and a water spray system attached to the body. The water spray system is configured to spray water in a water spray region in an interior of the body. In operation, intake air for the engine is drawn through the water spray region, where it encounters the water spray for removal of particulates from the intake air, and for cooling. Subsequent the water spray, the intake air is passed to the engine air intake.

In an embodiment, the water spray region, which is the entirety of the region in the body where water is sprayed, is filter-less, meaning there is no mesh (fiber) or other mechanical filter in the water spray region. Here, the intake air is only filtered within the water spray region of the assembly by way of its interaction with the water spray. This allows substantially all the particulates removed from the intake air by the water to fall to the bottom of the assembly for collection and subsequent filtration of the particulates from the water. It also allows for filtration and removal of relatively large particles, such as sand, without clogging a conventional mechanical filter.

In another embodiment, at least part of the water spray region is filter-less from a vertical perspective. That is, there is at least one sub-region of the water spray region, extending vertically from the top of the body (e.g., from spray outlet(s) of the water spray system where water is outputted into the water spray region), to the bottom of the body where water collects, where there is no mesh (fiber) or other mechanical filter through which the water would pass. Thus, in at least this sub-region, water can pass from the top of the body (e.g., spray outlets) to the bottom of the body, without encountering a mechanical filter. Such an arrangement facilitates the passage of removed particulates to the bottom of the body.

Another embodiment relates to an article of manufacture. The article includes a body (e.g., housing) having an interior. The article further includes a water spray system attached to the body. The water spray system is configured to spray water in a water spray region within the interior of the body. The body is configured for attachment to an air intake system of an engine, upstream of where intake air is drawn into the engine for combustion. The body is also configured for intake air to pass through the water spray region. The article also includes a plurality of slats traversing the water spray region in the interior of the body in a direction perpendicular to a flow direction of the intake air. In operation, the article is attached upstream of where intake air is drawn into an engine for combustion. Intake air is drawn through the water spray region, and the water spray system sprays water into the water spray region. The sprayed water removes particulates from the intake air, and cools the intake air. Interaction of the intake air and/or sprayed water with the slats creates turbulence, for helping to increase the extent to which particulates are removed.

Another embodiment relates to an article of manufacture. The article includes a body (e.g., housing) having an interior. The article further includes a water spray system attached to the body. The water spray system is configured to spray water in a water spray region within the interior of the body. The body is configured for attachment to an air intake system of an engine, upstream of where intake air is drawn into the engine for combustion. The body is also configured for intake air to pass through the water spray region. The water spray system includes a high pressure water assembly with one or more first water delivery conduits traversing the water spray region for removing particulates from intake air passing through the water spray region. The water spray system also includes a low pressure water assembly with one or more second water delivery conduits traversing the water spray region for cooling the intake air. The article also includes a plurality of turbulence-generating slats traversing the water spray region in the interior of the body in a direction perpendicular to a flow direction of the intake air.

Another embodiment relates to an air induction system for an engine. The system includes an intake conduit having an ingress and an egress, the ingress for receiving intake air from external to the engine and the egress for delivering the intake air to an intake of the engine. The system further includes an assembly coupled to the intake conduit between the ingress and egress. The assembly includes a body (e.g., housing) with an interior, and a water spray system, attached to the body, for spraying water in a water spray region in the body interior. When intake air passes through the water spray region, the sprayed water removes particulates from, and cools, the intake air flowing through the sprayed water. The body interior includes an unimpeded airflow path, at a macro level, extending from the ingress to the egress. Thus, intake air flowing through the assembly encounters only the water spray for particulate filtration. The assembly may further include a plurality of slats disposed in the water spray region, e.g., perpendicular to the flow of intake air through the water spray region, for creating air turbulence.

In an embodiment, each of the slats is a strip of metal, plastic, or other material, e.g., a relatively long and narrow strip of material. In an embodiment, each slat has a longitudinal axis defined by its longest dimension, which axis is perpendicular or about perpendicular (meaning perpendicular but for manufacturing tolerances) to the direction of intake air flow through the assembly.

As explained above, the terms "high pressure" and "low pressure" are relative, meaning that "high" pressure is a pressure higher than a "low" pressure. Conversely, a "low" pressure is a pressure lower than a "high" pressure.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. An air induction system for an engine, comprising:
an intake conduit; and
an assembly coupled to the intake conduit including a water spray for removing particulates from, and for cooling, intake air flowing through the water spray, the water spray being delivered by at least one conduit, the at least one conduit including a plurality of upstream conduits fluidically coupled to an upstream header and a plurality of downstream conduits fluidically coupled to a downstream header, the upstream conduits delivering a higher pressure water spray than the downstream conduits.

2. The air induction system of claim 1, wherein the at least one conduit traverses the assembly in a direction perpendicular to a flow direction of the intake air.

3. The air induction system of claim 1, wherein the water spray is delivered by at least two conduits traversing the assembly, and wherein each end of each of the at least two conduits is fluidically coupled to a U-shaped header which supplies water from a water pump, and wherein the at least two conduits are aligned in parallel with one another.

4. The air induction system of claim 1, wherein the upstream header is U-shaped and the downstream header is U-shaped, and wherein the plurality of upstream conduits are aligned in parallel to each other, and the plurality of downstream conduits are aligned in parallel with each other.

5. The air induction system of claim 1, wherein each of the plurality of upstream conduits and each of the plurality of downstream conduits include delivery ports which deliver water sprays in a plurality of different directions from the upstream and downstream conduits.

6. The air induction system of claim 1, wherein the assembly further includes one or more curved slats traversing the assembly in a direction perpendicular to a flow direction of the intake air, the one or more curved slats changing the flow direction of, and generating turbulence in, the intake air flow.

7. The air induction system of claim 6, wherein the one or more curved slats includes a plurality of curved slats dispersed throughout the assembly in an alternating inversion pattern.

8. An air induction system for an engine, comprising:
an intake conduit; and
an assembly coupled to the intake conduit including a water spray for removing particulates from, and for cooling, intake air flowing through the water spray, the assembly further including one or more curved slats traversing the assembly in a direction perpendicular to a flow direction of the intake air, the one or more curved slats changing the flow direction of, and generating turbulence in, the intake air flow, wherein at least one of the one or more curved slats is positioned upstream of a conduit that delivers the water spray to the assembly.

9. The air induction system of claim 1, wherein the particulates removed from the intake air and at least some water are collected in a collector positioned at a bottom of the assembly.

10. The air induction system of claim 1, wherein the assembly is positioned upstream of an intercooler coupled to the intake conduit.

11. The air induction system of claim 1, wherein the water spray is delivered by a plurality of delivery ports that are dispersed along each of a length, width, and depth of the assembly.

12. A method for an air intake system, comprising:
inducting a flow of intake air through an assembly;
generating turbulence in the flow of intake air in the assembly;
removing particulates from the flow of intake air via a plurality of water sprays in the assembly including an upstream water spray from a plurality of upstream conduits and a downstream water spray from a plurality of downstream conduits by operating a high pressure water pump to deliver the upstream water spray to an interior of the assembly, the upstream water spray delivering a higher pressure water spray than the downstream water spray and spanning a cross-section from top to bottom of the interior of the assembly;
cooling the flow of intake air via the plurality of water sprays in the assembly; and
directing the flow of intake air from the assembly to an engine.

13. The method of claim 12, wherein generating turbulence includes flowing the intake air over curved slats which traverse the assembly in a direction perpendicular to a flow direction of the intake air.

14. The method of claim 12, further comprising operating a low pressure water pump to deliver the downstream water spray to the interior of the assembly, the downstream water spray spanning the cross-section from top to bottom of the interior of the assembly.

15. The method of claim 12, further comprising collecting the particulates removed from the flow of intake air and at least some water in a collector positioned at a bottom of the assembly, and draining the collected particulates and the at least some water to a water filtration circuit.

16. The method of claim 12, further comprising filtering the flow of intake air via a perforated screen positioned at an upstream side of the assembly before the flow of intake air interacts with the water sprays.

17. An article of manufacture, comprising:
a water spray region through which particulate-laden intake air can flow;
a plurality of turbulence-generating slats traversing the water spray region in a direction perpendicular to a flow direction of the intake air;
a high pressure water assembly with one or more first water delivery conduits traversing the water spray region for removing particulate from the intake air;
a low pressure water assembly with one or more second water delivery conduits traversing the water spray region for cooling the intake air; and
a water circuit fluidically coupled to the high pressure water assembly and the low pressure water assembly including a high pressure pump for the high pressure water assembly and a low pressure pump for the low pressure water assembly.

18. The article of manufacture of claim 17, wherein the water circuit includes at least one filter.

19. The article of manufacture of claim 18, wherein a water supply of the water circuit includes sea water which is external to a ship in which the article is positioned, and wherein the article is coupled to an engine of the ship.

20. An air induction system for an engine, comprising:
an intake conduit having an ingress and an egress, the ingress for receiving intake air from external to the engine and the egress for delivering the intake air to an intake of the engine; and
an assembly coupled to the intake conduit between the ingress and egress, the assembly including a water spray for removing particulates from, and for cooling, the intake air flowing through the water spray and one or more curved slats transversing the assembly in a direction perpendicular to a flow direction of the intake air, at least one of the one or more curved slats being positioned upstream of a conduit that delivers the water spray;
wherein the assembly includes an unimpeded airflow path, at a macro level, the airflow path extending from the ingress to the egress, whereby the intake air flowing through the assembly encounters only the water spray for particulate filtration.

21. The air induction system of claim 20, wherein at the macro level, a cross-section of the unimpeded airflow path is at least 1 mm in height and width.

22. The air induction system of claim 20, wherein the particulates removed from the intake air fall uncollected to a bottom of the assembly.

23. The air induction system of claim 21, wherein the assembly further includes a collector positioned at the bottom of the assembly which includes a drain that is fluidically coupled to a water filtration circuit.

* * * * *

UNITED STATES PATENT AND TRADEMARK OFFICE
CERTIFICATE OF CORRECTION

| | |
|---|---|
| PATENT NO. | : 8,328,591 B2 |
| APPLICATION NO. | : 12/968509 |
| DATED | : December 11, 2012 |
| INVENTOR(S) | : Larson et al. |

It is certified that error appears in the above-identified patent and that said Letters Patent is hereby corrected as shown below:

In Column 12, Line 55, in Claim 20, delete "transversing" and insert -- traversing --, therefor.

Signed and Sealed this
Nineteenth Day of March, 2013

Teresa Stanek Rea
*Acting Director of the United States Patent and Trademark Office*